May 20, 1930.  E. C. MOGFORD ET AL  1,759,059
METHOD OF MAKING METAL WHEELS
Original Filed April 19, 1926
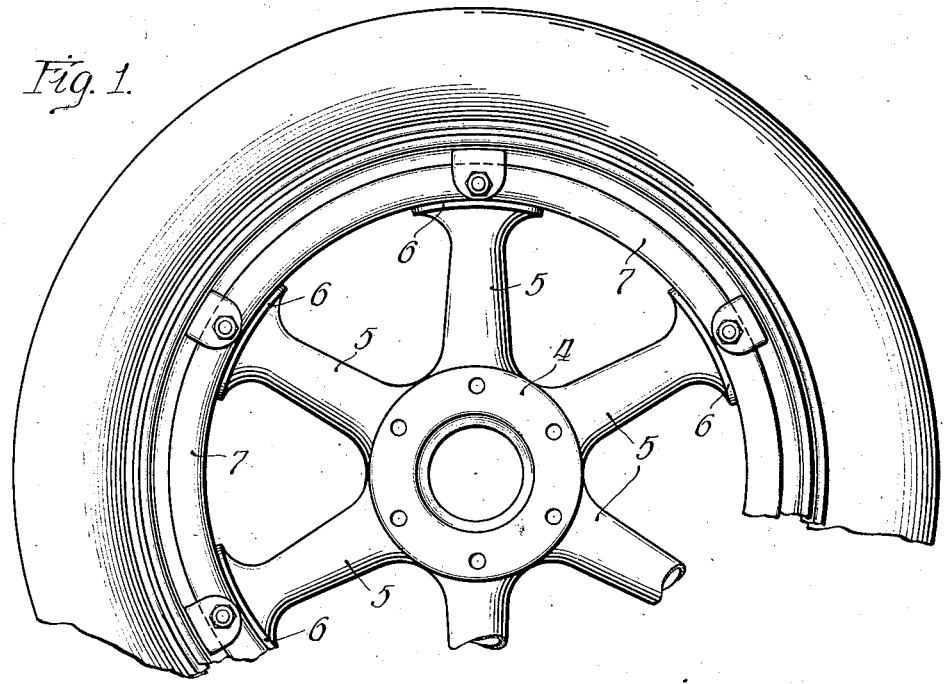
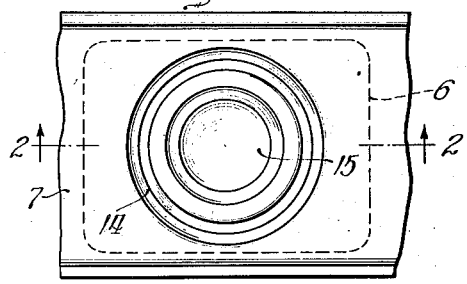
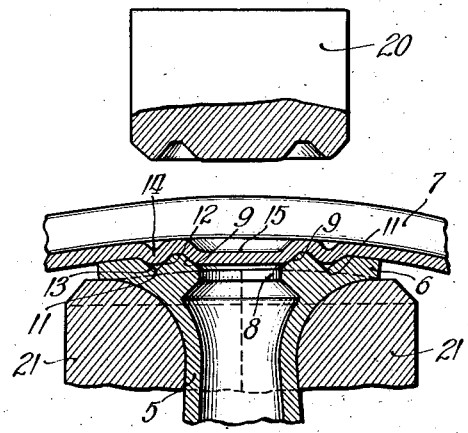
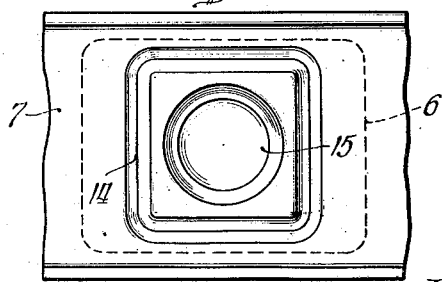
Inventors:
Edmund C. Mogford
Frederick W. Burger
By Mason Jackson Rottener Lauver
Atty's Patented May 20, 1930

1,759,059

UNITED STATES PATENT OFFICE

EDMUND C. MOGFORD, OF BUCHANAN, AND FREDERICK W. BURGER, OF NILES, MICHIGAN, ASSIGNORS TO CLARK EQUIPMENT COMPANY, OF BUCHANAN, MICHIGAN, A CORPORATION OF MICHIGAN

METHOD OF MAKING METAL WHEELS

Original application filed April 19, 1926, Serial No. 102,892. Divided and this application filed April 19, 1928. Serial No. 271,256.

The present invention relates to the making of metal wheels of the spoke type and embodies certain improvements and refinements upon the invention disclosed in our copending application, Serial No. 33,657, filed May 29th, 1925.

This application is divisional of our copending application, Serial No. 102,892 filed April 19th, 1926.

In said copending applications we have disclosed an improved construction of metallic wheel and method of making the same, wherein the wheel is built up or constructed from a rigid spider preferably made of a hollow casting which constitutes a hub and hollow spoke structure, and a continuous metal rim or felly which is preferably in the shape of a wrought metal continuous band of outwardly facing channel section secured upon the outer ends of this hollow spoke structure. One of the features of the aforesaid invention disclosed in the earliest application resides in the manner of securing the metal rim in interlocking engagement with the ends of the hollow spokes.

In the particular method therein disclosed the metal of the rim, that is, the web portion of the rim, is pressed into the outer open ends of the spokes, forming drawn depressions or punched spigots extending into the ends of the spokes.

According to the present invention the rim and the spokes are interlocked by forming a multiplicity of points of interlocking engagement between the web of the rim and the spoke end after the spider has been forced in compression into the rim under tension, which points of engagement are distributed over a considerable area on the outer end of the spoke and on the web of the rim so that no part of the web of the rim is overstressed or punctured, which would tend to destroy to a considerable extent the strength of the web, and hence injure an important structural member in the interstressed structure. By joining the rim and the spoke according to the present method the metal in the rim does not have to be drawn or extruded through any considerable distance, and consequently there is no tendency for attenuation or destructive strain of the metal. This is of decided advantage in many instances because of the varying thicknesses or gauges of metal used in different rims, and not only is a strong interlocking joint secured by multiplicity of shoulders but the structural strength is not impaired.

A further important advantage in the present method of interlocking the rim and the ends of the spokes resides in the fact that the formation of these interlocking shoulders between rim and spokes tends still further to tension the web of the rim and hence the rim itself, which is highly beneficial in securing the interstressed relation of rim and spokes forming the wheel.

According to the present invention the ends of the spokes are formed with enlargements or so-called pads which extend out laterally from the shaft or column of the spoke at the point where the spoke engages the rim. This pad or enlargement has a double function. First, it provides a relatively large bearing surface between the end of the spoke and the web of the rim, and second, it serves as a convenient means for supporting the end of the spoke when the web is pressed down into interlocking engagement with the end of the spoke.

By thus supporting the pad and operating upon the web over it the main body of the wheel is not subjected to the stress which is required to deform the web of the rim to form the interlocking shoulders. Since very considerable force is required thus to deform the web of the rim into engagement with the shoulders on the end of the spoke, if the same is not immediately taken up by the support of the pad it would be transmitted through the wheel and it might be great enough to injure the spoke or to deform the entire wheel.

The nature of our invention will clearly appear from the following description taken in connection with the accompanying drawings, in which—

Fig. 1 is a fragmentary side elevational view of a wheel constructed in accordance with our invention.

Fig. 2 is a detail sectional view of the interlocking joint produced between the rim and the outer end of each spoke, this view corresponding to a section taken on the plane of the line 2—2 of Fig. 3, with the joint producing dies in position.

Fig. 3 is a fragmentary plan or outer elevational view of the rim showing the interlocking deformations therein; and Fig. 4 is a similar view showing an interlocking bead of modified outline.

The wheel constructed in accordance with our invention comprises a hub and spoke structure, which is preferably cast as a unit, the spokes being hollow and relatively thick and short and provided at their outer ends with pads or laterally extending seats having cylindrical spaces adapted to receive and support a rim of outwardly facing channel section. The rim has relatively great strength to resist bending and crushing and will support a great load in tension. The casting that constitutes the hub and spokes may be made of steel or malleable iron, and the rim is preferably a continuous steel band of known form providing a felloe and supporting a tire carrying rim preferably of the demountable type. Referring to the drawings, 4 indicates the hub portion of the casting, 5 the spokes, and 6 the pads or enlargements at the outer ends of the spokes which support the rim 7. The pads 6 are chamfered at one side along their outer margin to facilitate pressing the hollow spoke structure into the rim which is preferably done by means of a hydraulic press, although conceivably the rim may be put upon the spider in any other preferred manner which will result in placing the rim under tension upon the outer ends of the spokes which are thereby held in compression.

Referring to Fig. 2, the spokes 5 are hollow, and the end of each spoke opens out through the outer surface of its pad 6 through the hole 8. The margin of this hole or opening 8 is preferably tapered or beveled to form the inclined interlocking surface 9. Formed in the outer surface of the pad 6 and surrounding the opening 8 is a substantially continuous groove or surface identation 11 which is spaced from the opening or depression 8 laterally with respect to the axis of the spoke. This groove may be either U-shaped or V-shaped in section, preferably the latter, so as to form two sloping locking surfaces 12 and 13 between the depressions 8 and 11. The groove 11 may be of circular outline as shown in Fig. 3, or it may be oval or rectangular in form, the latter construction being shown in Fig. 4. The depression 8 or the beveled surface 9 together with the groove 11 define an intermediate ridge or high point therebetween across which the metal of the rim can be stretched as will hereinafter appear.

In constructing the wheel the unitary hub and spoke structure is first formed of a casting or otherwise formed as a rigid structure and is brought to a suitable initial size sufficiently larger in its outer diameter than the inside diameter of the rim so as to secure a good tight fit or its equivalent if the assembly is otherwise secured. Where the parts are assembled by a pressing operation the hub and spoke structure is forced laterally into the continuous rim 7 to bring the pads to their proper place relative to the width of the rim.

The chamfered side edges of the pads 6 facilitate the forced insertion of the spoke structure into the rim. To facilitate proper assembly the spider is preferably pre-sized so that the outer surfaces of the pads 6 will be approximately cylindrical to conform to the inner cylindrical surface of the rim with which it is to be assembled. The action of forcing the spider into the felloe or otherwise securing the rim upon the ends of the spokes places the felloe under a relatively great compression, and the wheel remains in this condition at all times even under load. The wheel is then presented to the action of a suitable power press having a suitably formed pressing die 20 which operates upon the outer surface of the web of the rim directly over the spoke-end, this spoke-end and pad being fixedly held in a stationary split die 21. By thus supporting the pad 6 when the depression of the web into the groove 14 and recesses 15 occurs the stress required to force the web of the channel into the recess or recesses in the pad does not come upon the rest of the wheel. This is highly advantageous as it localizes the stress upon a part that is well adapted to sustain the great pressure required. The pressing die 20 presses a bead 14 from the web of the rim down into the groove 11. Simultaneously therewith the die presses or draws a cup-shaped depression 15 down into the opening 8 in the end of the spoke. Such depression of the metal of the web of the channel-shaped felloe into the groove 14 and recess 15 tends to increase still further the tension of the rim upon the outside of the spider.

The bead 14 thus formed in this pressing operation will have interlocking engagement with the two concentric locking surfaces 12, 13 of the pad 6. Also the drawn or punched portion 15 will have interlocking engagement with the central interlocking surface 9 formed at the end of the spoke. Thus three lines of interlocking engagement between the rim and the spoke will be secured as distinguished from the single line of interlocking engagement that characterizes all earlier inventions wherein the metal is merely pressed down into the open end of the spokes. It will be observed that these three lines of interlocking engagement are distributed considerably over the outer surface of the pad 6 which is advantageous in that it distributes any separating stresses between the rim and spoke over a relatively wide area of rim metal. It is not necessary to draw or extrude the metal through any considerable distance in securing this interlocking relation—the bead 14 and cap 15 being both comparatively shallow—and hence any tendency of the metal to attenuate or to have injurious strains set up therein is largely avoided. Thus rims having different thicknesses or gauges of metal may be employed without injury to the rim or weakening of the joint.

Because the flared under side of the pad 6 is rigidly supported in the stationary split die 21 during this operation and because the metal of the rim is backed up by the upper surface of the pad it is possible to exert considerable pressure upon this metal so that this portion of the rim can be stretched tight and in firm contact with the gripping circle or pressure point formed by the locking surfaces 9, 12 and 13.

The drawing of the central cup-shaped depression 15 is advantageous in that it tends to stretch or draw the metal tight over the top of the ridge 10; nevertheless this central depression may be omitted entirely as the interlocking engagement between the bead 14 and the groove 11 is of ample strength. Where this depression 15 is formed in the metal it preferably consists of a drawn form as shown, although if desired this part of the metal might be punched down into the open end of the spoke to form an inwardly extending spigot. It will be observed that with the construction described the locking surfaces on the spokes are provided without materially affecting the substantially cylindrical contour of the outer face of the pads so that the forcing of the spider into the rim is not interfered with.

We claim:

1. In a wheel having a hollow spoked spider held under compression by a rim under tension, the method of interlocking the rim and spider which comprises supporting the end of a spoke adjacent its bearing on the rim independently of the rest of the spider and pressing the metal of the rim into interlocking engagement with the end of the spokes.

2. The method of making a wheel which comprises forming a circular felloe of outwardly facing channel section with flanges deep enough to resist distortion of the felloe upon forcing a spider thereinto, forming a rigid spider with hollow spokes having enlarged pads upon the ends thereof, assembling the felloe under tension upon the spider under compression, supporting the pad on the end of a spoke and pressing the web of the channel into the end of the spoke.

3. The method of making a wheel which comprises forming a continuous circular felloe having a cylindrical web and outwardly extending flanges, forming a rigid spoked spider with recessed pads on the outer ends of the spokes, assembling the felloe under tension upon the spider under compression, supporting the pads on the ends of the spokes and pressing the metal of the web into the recesses of said pads.

4. The method of making a wheel which comprises forming a continuous circular felloe of outwardly facing channel section, forming a hollow cast spider with integral enlarged pads upon the outer ends thereof, recessing the peripheral faces of the pads, forcing the spider into the felloe to put the felloe under tension and the spider under compression, pressing the web of the felloe into the recesses in a pad and simultaneously supporting the pad to prevent stressing of the remainder of the spider.

5. The method of constructing a wheel which comprises casting the hub and spokes in the form of a unitary spider with a plurality of interlocking depressions formed in the outer end of each spoke, and laterally extending flanges on the end of the spoke, assembling a continuous metal rim upon the spider, supporting the spider upon the laterally extending flanges of a spoke, and then pressing portions of the rim metal inwardly to interlocking engagement with the interlocking depressions in the outer end of the spokes.

6. The method of making a wheel which comprises forming a rigid spider comprising a hub and spokes with laterally extending flanges upon the outer ends thereof, recessing the ends of the spokes, forming a continuous rim of outwardly facing channel section, assembling the rim in tension upon the spider in compression, depressing the metal of the web of the rim into the recess of the spoke and simultaneously supporting the flanges of the spoke over which pressure is applied.

7. In a wheel having an outwardly facing channel shaped rim and a spoked spider embraced thereby, the method of interlocking the metal of the rim into the ends of the spokes which comprises deforming the metal of the rim by pressure applied thereto in line with the spokes and individually supporting the ends of the spokes to take up the reaction of said pressure.

8. In the manufacture of a wheel of the class described, the method which comprises forming a rigid spider with enlarged pads on the outer ends thereof and forming recesses in the peripheral faces of the pads forming a channel shaped rim, stretching the rim over the ends of the pads, pressing the web of the rim into the recess of a pad and simultaneously supporting the pad to take up the reaction of said pressing.

In witness whereof, we hereunto subscribe our names this 13 day of April, 1928.

EDMUND C. MOGFORD.
FREDERICK W. BURGER.